(No Model.) 2 Sheets—Sheet 2.
L. P. BUTLER.
CORNSTALK CUTTER.
No. 450,611. Patented Apr. 21, 1891.
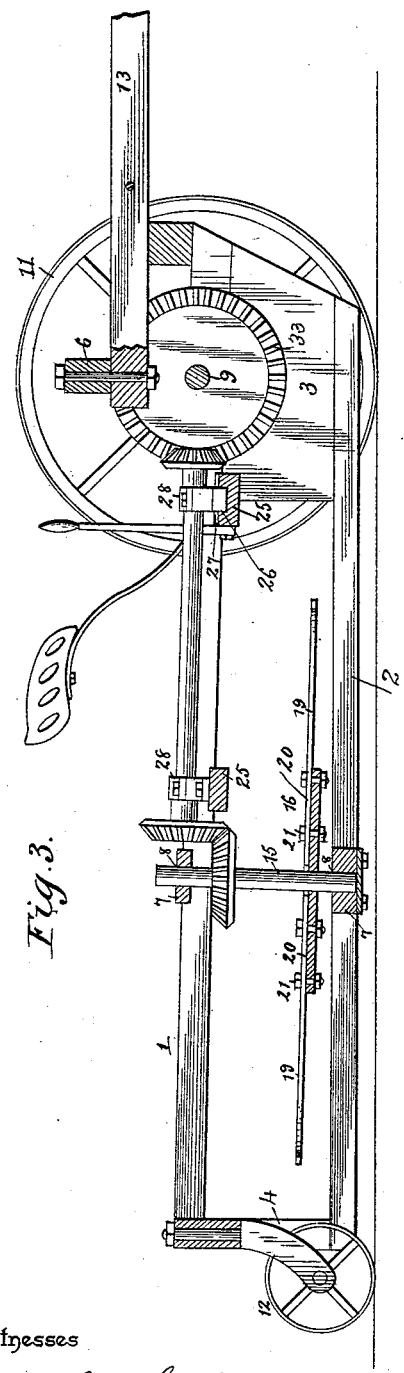
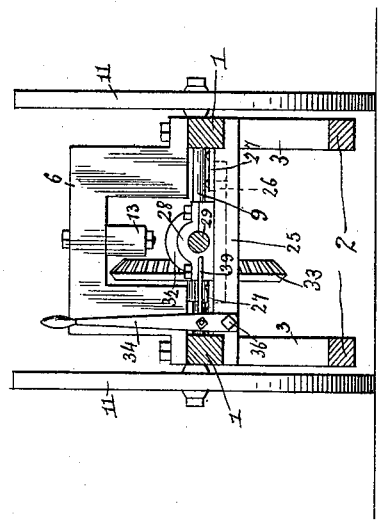
Witnesses
Jas. L. McCachran
Wm Bagger
Inventor
Lewell P. Butler
By his Attorneys,
C. A. Snow & Co.
THE NORRIS PETERS CO., PHOTO-LITHO., WASHINGTON, D. C.

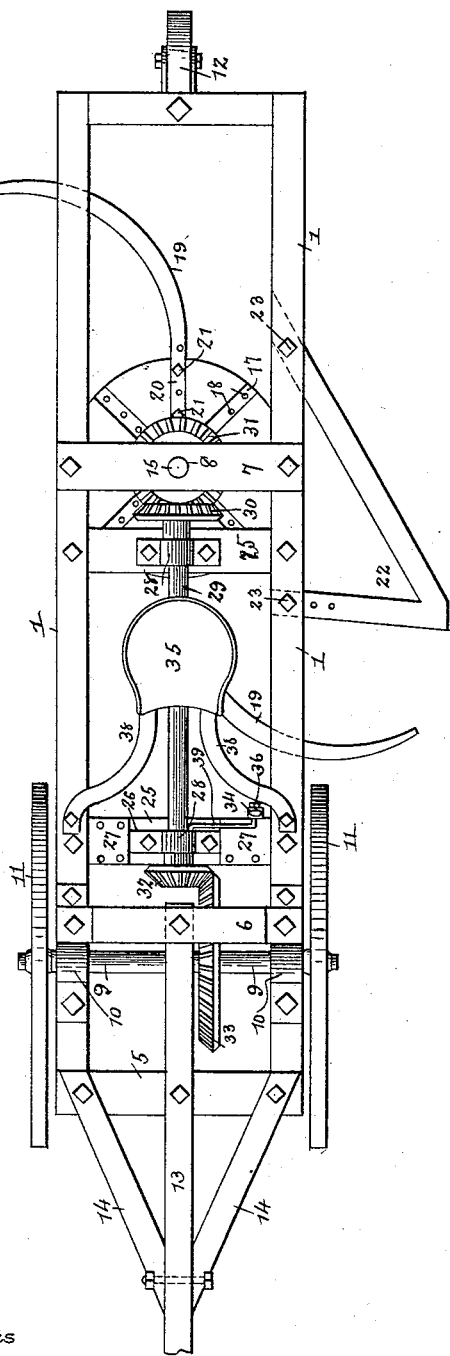

UNITED STATES PATENT OFFICE.

LEWELL P. BUTLER, OF GIBSLAND, LOUISIANA.

CORNSTALK-CUTTER.

SPECIFICATION forming part of Letters Patent No. 450,611, dated April 21, 1891.

Application filed August 19, 1890. Serial No. 362,416. (No model.)

*To all whom it may concern:*

Be it known that I, LEWELL P. BUTLER, a citizen of the United States, residing at Gibsland, in the parish of Bienville and State of Louisiana, have invented a new and useful Cornstalk-Cutter, of which the following is a specification.

This invention has relation to cornstalk-cutters; and the objects of the invention are to provide a machine of simple and economical construction adapted to sever cornstalks, cut weeds, &c., and to provide means for throwing the cutting mechanism into and out of operative position for adjusting the knives, &c.

With the above objects in view the invention consists in certain features of construction hereinafter specified, and particularly pointed out in the claims.

Referring to the drawings, Figure 1 is a plan view. Fig. 2 is a side elevation with the rear wheel removed. Fig. 3 is a longitudinal section. Fig. 4 is a detail in perspective of the knife-carrying wheel. Fig. 5 is a transverse section in rear of and looking toward the shifting-lever.

Like numerals of reference indicate like parts in all the figures of the drawings.

The frame-work of the machine comprises an upper and lower oblong frame, designated as 1 and 2, respectively, which frames are connected at their front ends by blocks 3 and at their rear ends by posts 4. The opposite side bars of the frames are connected at their front ends by a transverse bar 5, in rear of the same by a yoke 6, and in rear of the yoke by a pair of vertically-opposite transverse bars 7, in which are formed bearings 8.

An axle 9 is journaled in bearings 10 near the front end of the frame and in the upper oblong frame thereof, and said axle outside of the frame carries ground wheels 11. In the rear end bar of the frame-work is swiveled a caster-wheel 12, so that the entire frame is supported above the ground a short distance, and, as will be observed, the upper oblong frame is inclined to the front slightly by reason of the posts 4 being slightly higher than the blocks 3.

The draft-bar 13 is secured to the upper side of the transverse bar 5, and its rear end extends under and is secured to the yoke 6, said draft-bar being braced at each side by a hound 14, bolted at its front end to the draft-bar and at its rear end to the bar 5.

In the bearings 8 there is mounted for rotation a shaft 15, which, by reason of the upper oblong frame being slightly inclined, is also inclined, and mounted upon the shaft between the frame is a disk or wheel 16, the upper face of which is provided with a series of radial grooves 17, in which are formed adjusting openings or perforations 18.

19 designates the knives or cutters, the cutting ends of which are curved, as shown, and said knives terminate at their rear ends or heels in straight shanks 20. If desired, the wheel 16 (herein shown as a solid disk) may be cut out or be made in skeleton form to lend lightness. The shanks are also perforated and align with the perforations 18, and through said perforations are passed set-bolts 21. As many knives or cutters as may be desired may be employed, but ordinarily two or three will be found adequate. By means of the adjusting-holes and the bolts the cutters may be extended or contracted, and thus the path in which they travel increased or diminished, as will be readily understood.

From the upper and lower longitudinal side bars at one side of the two oblong frames at points opposite the knife-carrying wheel, are secured triangular outwardly-projecting frames 22, preferably formed of metal and secured in position by means of bolts 23, passing through the said side bars and the ends of the frames, which latter at their front ends are provided with adjusting-holes, whereby said frames may be adjusted in or out. Between these frames travel the knives during the rotations of the wheel, and cornstalks coming against the frames are supported during the severing of the stalks by the knives. As the machine moves along the front bar 15, together with the bars hereinafter mentioned, serve to bend or depress any weeds in front of the machine, so that they are held down until the arrival of the knives, which readily sever the weeds. It will be apparent that the knives may be increased or decreased in number.

Between the yoke 6 and the upper transverse bar 7 there is located in the upper oblong frame a pair of transverse bars 25. The front transverse bar 25 is grooved throughout its length, as at 26, and the ends of the grooves are covered by plates 27.

28 designates bearing-castings, of which there is a pair, one being located and adapted to slide in the groove 26 and the other securely bolted to the rear bar 25. A longitudinal shaft 29 is journaled in the aforesaid bearing-castings and terminates at its rear end in a beveled gear 30, which engages and operates a similar beveled gear 31, made fast to the shaft 15 above the cutter-wheel. The front end of the longitudinal shaft carries a small pinion 32, which is engaged and run by a master-gear 33, made fast to the axle 9. To the rear side and near one end of the transverse bar 25 there is pivoted, as at 36, a hand-lever 34, the upper end of which extends within easy reaching distance of the driver's seat 35, supported upon standards 38. The front casting 28, or that one that slides in the groove 26, is connected to the lever above the pivot of the latter by a crank-shaped connecting-rod 39. By moving the lever 34 it will be observed that the bearing-casting 28 may be moved in the groove, so that the small pinion at the front end of the longitudinal shaft is thrown into and out of engagement with the teeth of the master-gear, and thus the cutting mechanism may be thrown into and out of operation, as will be apparent.

By reason of the upper bars 1 of the frame-work being inclined the cutter or knife carrying shaft and wheel will be inclined, and thus the cutting-edges of the knives are presented to the stalks at an incline and a shear-cut made.

Having thus described my invention, what I claim is—

1. In a stalk-cutter, the combination, with the frame-work comprising upper and lower oblong frames suitably secured together, and a pair of vertically-opposite triangular frames bolted to one side of said oblong frames and extending therefrom, of a vertical shaft journaled in the oblong frames, a wheel mounted on the shaft, means for operating the shaft, and a series of curved knives adjustably mounted upon the wheel and adapted to be revolved between the triangular frames, substantially as specified.

2. In a stalk-cutter, the combination, with the frame-work, a vertical shaft mounted therein, a knife-carrying wheel mounted on the shaft, a bevel-gear mounted upon the shaft above the wheel, of an axle having ground wheels and an intermediate master-gear, a pair of transverse bars located in the frame-work between the master-gear and the knife-carrying wheel, one of said bars being longitudinally grooved, opposite bearing-castings, one of which is bolted to the rear transverse bar and the front one of which is mounted for movement in the groove of the front bar, a longitudinal shaft mounted in the castings and terminating in gears, one of which meshes with the master-gear and the other one of which with the gear of the knife-wheel carrying-shaft, a lever pivoted to the frame-work, and a rod connecting the lever with the reciprocating casting, substantially as specified.

In testimony that I claim the foregoing as my own I have hereto affixed my signature in presence of two witnesses.

LEWELL P. BUTLER.

Witnesses:
J. D. PACE,
P. B. BROOKS.